Patented Nov. 3, 1953

2,658,092

UNITED STATES PATENT OFFICE 2,658,092

RUBBER PROCESSING

Bernard C. Barton, Clifton, N. J., assignor to United States Rubber Company, New York, N. Y., a corporation of New Jersey No Drawing. Application March 30, 1951, Serial No. 218,517

8 Claims. (Cl. 260—763)

This invention relates to improvements in the technique of processing high carbon black and rubber mixes prior to vulcanization thereof.

The technique of processing rubber mixed with high amounts of reinforcing carbon black, whereby to obtain vulcanizates with improvements in physical and chemical properties, is described in Gerke et al. U. S. Patent 2,118,601. The improved vulcanizates prepared by the technique of Gerke et al. differ from the usual vulcanizates produced by older techniques in that they have relatively (1) lower modulus at low elongation, (2) higher modulus above 300% elongation, (3) higher resistance to abrasion, (4) lower torsional hysteresis, and (5) higher electrical resistivity, and are (6) relatively softer.

These improved vulcanizates are obtained by incorporating uniformly in the rubber a relatively large amount of reinforcing carbon black, for example, at least 25 parts, and preferably, in the case of tire treads, at least 40 parts, by weight, of carbon black per 100 parts by weight of rubber, and then subjecting the uniformly mixed masterbatch to a special heat treatment at a temperature substantially above 250° F., the preferred temperature being in the range from about 300° F. to 370° F., and masticating the mix during and/or after such heat treatment, or alternately therewith. The duration of the special heat treatment may vary with the temperature employed, the higher the temperature the shorter the time, and is governed also by the degree of change desired in the properties of the ultimate vulcanized product which properties are gauged to be compatible with its final use. In general, heat treatments of from 10 to 60 minutes duration will be found suitable for most purposes, particularly within the preferred temperature range.

An object of the present invention is to provide a new chemical promoter for the processing of mixtures of rubber and reinforcing carbon black described in U. S. Patent 2,118,601, and referred to herein as low-hysteresis processing, whereby to obtain tread stocks of high electrical resistance and low torsional hysteresis. A further object is to provide substantial decreases in the time required for the low-hysteresis processing, by the use of the herein-disclosed chemical, with consequent increase in the capacity and output of equipment.

I have discovered that the time required for low-hysteresis processing of the type disclosed in the above-mentioned Gerke et al. patent can be substantially decreased by incorporating chloranil in the mixture of rubber and carbon black, with or without softeners, prior to the heat treatment.

In practicing my invention, I typically incorporate a relatively small amount of chloranil, preferably from 0.25 to 2.0 parts thereof per 100 parts of rubber, with the well-mixed blend of rubber and carbon black, the temperature at which the chloranil is incorporated being well below any temperature at which the chloranil would be thermally decomposed or caused to react with the rubber to any substantial extent. The temperature at which the chloranil is incorporated with the carbon black and rubber is substantially below 250° F. and preferably is not over 180° F. in order to prevent any substantial decomposition of the chloranil, reaction thereof with the rubber, or sublimation of the chloranil. Thereafter, I subject the resulting mixture containing the chloranil intimately and uniformly distributed therethrough to an elevated temperature substantially above 250° F. and preferably ranging from 300° to 370° F. In any event, the temperature should not be so high as to materially injure the properties of the rubber. Likewise, the time of the elevated temperature treatment of the rubber-carbon black-chloranil mix should be so limited as not materially to injure the properties of the rubber.

The heat treatment is typically effected by masticating the rubber-carbon black-chloranil mixture at the elevated temperature employed for a length of time sufficient to bring about particulate dispersion of the carbon black throughout the mass without, however, seriously deteriorating the rubber. Thereafter, the mixture is cooled whereupon the vulcanizing and any other desired ingredients are incorporated and the resulting mixture is then shaped and vulcanized in the conventional manner.

If desired, the mastication of the mixture may take place after the heat treatment. For example, if the heat treatment is conducted with the mixture in the static condition, the mastication to effect the particulate dispersion of the carbon black can be carried out after the heat treatment. If desired, the static heat treatment and the mastication can be alternately carried out, the mixture for example being first statically heat-treated, then masticated, again statically heat-treated, again masticated and so on until the desired particulate dispersion of the carbon black is achieved.

The duration of the heat treatment will vary with the temperature employed. Generally speaking, the higher the temperature the shorter the time of heat treatment. The duration of the heat treatment will also depend upon the degrees of change desired in the properties of the ultimate vulcanizate which properties are gauged to be compatible with the final use of the vulcanizate. In general, heat treatments of from 10 to 60 minutes duration will be found suitable for most purposes. These times are particularly applicable when a heat treatment temperature of from 300° to 370° F. is employed It will be seen that the heat treatment is carried out in the absence of vulcanizing ingredients which would, of course, defeat the purpose of the invention. Following the heat treatment, the mixture is cooled to a temperature at which it will not undergo scorching or pre-vulcanization during incorporation of the vulcanizing ingredients. Then the vulcanizing ingredients, together with any other compounding ingredients whose addition is desired, are intimately incorporated at such a lower temperature, the resulting mixture being then shaped and vulcanized in the usual way.

By the use of chloranil as a chemical promoter in accordance with the present invention, it is possible to obtain the benefits of low-hysteresis processing to a given extent in a substantially shorter time with consequent increase in the capacity and output, i. e., productivity of the equipment.

The amount of chloranil employed as chemical promoter in accordance with my invention can vary widely. Enough should be used to substantially expedite the heat treatment of the mixture of carbon black and the rubber. The maximum amount used is determined by considerations of cost and of effectiveness in proportion to amount used. As previously stated, I prefer to employ amounts ranging from 0.25 to 2.0 parts per 100 parts of rubber. Amounts within this range are highly effective and at the same time are not prohibitively expensive. Those skilled in the art will appreciate that the amount of chloranil employed should be correlated with the temperature and other factors of the heat-treating step. I have obtained very satisfactory results by using 0.75 part of chloranil per 100 parts of rubber and carrying out the heat treatment in a Banbury mixer for 20 minutes at 300° F.

The chloranil can be added at any time during the characteristic heat treatment of the carbon black and rubber mixture wherein the hysteresis of the carbon black and rubber mixture is considerably reduced. It is preferred that all of the carbon black be present during the heat treatment. If a portion of the carbon black is incorporated after the heat treatment of the mixture containing the balance of the carbon black, the rubber and the chloranil, the benefits of the invention are proportionately diminished.

My invention is applicable either to natural rubber (Hevea) or to synthetic rubbers of the types which are generally considered to be closely analogous to, and as having properties in common with, natural rubber, particularly rubbery copolymers of a major proportion of an aliphatic conjugated diolefin hydrocarbon of the butadiene type, e. g., butadiene-1,3 or isoprene, and a minor proportion of a second copolymerizable monomer such as styrene, methyl acrylate, methyl methacrylate, acrylonitrile or vinylpyridine. My invention is also applicable to mixtures of natural rubber and such synthetic rubbers. Any of the known types of rubbery butadiene-styrene or isoprene-styrene copolymers can be used in the practice of my invention, such as standard GR-S and the so-called "cold" GR-S. My invention is most preferably applied to natural rubber (Hevea) since the magnitude of the improvement brought about is much greater with this rubber than with synthetic rubbers, e. g., GR-S. In some cases, only a part of the rubber component is subjected to heat treatment in the presence of carbon black and the chloranil promoter, the balance of the rubber being subsequently incorporated.

My invention is particularly advantageous when applied to the processing of tire tread compositions. It will be understood that such tire tread compositions, after the heat treatment, but prior to final vulcanization, are subjected to the conventional steps of incorporating vulcanizing and other desired ingredients, followed by shaping and incorporation into the entire structure. Preferably, the final tire embodies, at least as its tread portion, a vulcanized composition which has been processed in accordance with the principles of my invention.

While the invention is particularly important in relation to tire tread compositions, it is also applicable to the manufacture of any rubber products in which there are desired the qualities of high abrasion-resistance, toughness, flexibility, high electrical resistivity, low hysteresis, etc., e. g., such products as footwear outsoles, pneumatic inner tubes, belting, vibration-absorbing mountings, etc.

The reinforcing carbon blacks which are employed in my invention are well-known and include both channel blacks and furnace blacks.

The amount of carbon black employed in practicing my invention is not critical but is usually within the range of from 25 to 100 parts per 100 parts of rubber. These figures are exclusive of any rubber or carbon black added subsequent to the heat-treating step.

In a typical embodiment of my invention, I subject the mixture of carbon black, rubber and chloranil to hot mastication at the indicated temperature, in a suitable mixing device such as a Banbury mixer or a two-roll rubber mixer until particulate dispersion of the carbon black throughout the mass is obtained.

Instead of heat-treating by hot mastication, I can conduct the heat treatment in a heater in which the static mixture of rubber, carbon black and chloranil is subjected to a heated gaseous atmosphere such as hot air, steam, a mixture of air and steam, nitrogen, etc. or to a heated liquid medium in which the mixture is immersed, such as hot water. The necessity of using an autoclave to withstand the pressure developed, as temperatures much above the boiling point of water at atmospheric pressure are used, makes this latter method of heat treatment considerably less desirable.

When the heat treatment is carried out in a heated fluid medium, the mixture of carbon black, rubber and chloranil is preferably exposed in the form of thin layers such as the thin sheets which are obtained by sheeting the mixture from a conventional rubber mill or calender. Otherwise, access of heat to the interior portions of the mixture would be too slow because of the relatively low thermal conductivity of the mixture, resulting in reduced productivity or a non-uniform product. I prefer that the rubber mix undergoing such static heat treatment be not over ⅛ inch in thickness.

In practicing my invention, conventional softeners and other ingredients which will not cause vulcanization of the rubber during the heat treatment can, if desired, be included in the initial mixture of carbon black, rubber and chloranil. The inclusion of the usual softeners in this mixture prior to the heat treatment is often desirable in order to facilitate the initial admixture and uniform distribution of the carbon black in the rubber. Examples of softeners which can be so incorporated are oils, fatty acids (e. g., stearic acid), fatty acid soaps and mineral rubber. I can also blend reclaimed rubber with the raw rubber which is mixed with the carbon black and chloranil.

Although the vulcanizing agent incorporated after the heat treatment is usually sulfur, I can use other agents known to the art to be capable of vulcanizing rubber in the presence of carbon black.

After addition of the vulcanizing agent, together with any other desired components, the mixture is vulcanized in any known manner. I can use mold cures, air cures, ammonia cures, submarine cures, steam cures, etc. The vulcanization does not per se constitute a part of my invention.

It will be seen that the process of my invention comprises the following essential steps:

1. Mixing together the rubber, carbon black and chloranil at a relatively low temperature at which the chloranil is not substantially decomposed or caused to react with the rubber.
2. Heat-treating the resulting mixture, either by mastication, or static treatment, at a temperature substantially above 250° F. ranging upwardly to the temperature of injury to the rubber for a time sufficiently long to substantially increase the electrical resistivity and abrasion-resistance of a vulcanizate of the heat-treated mixture and to substantially decrease the torsional hysteresis of such vulcanizate.
3. Masticating or milling the mixture, either during or subsequent to the heat treatment in the presence of the chloranil.
4. Incorporating vulcanizing and other ingredients. Usually these ingredients are incorporated during mastication or milling following the heat treatment. These ingredients are, of course, incorporated at a temperature sufficiently low to preclude vulcanization.
5. Shaping.
6. Vulcanizing the shaped mixture.

It will be understood that the entire processing of the rubber is controlled within limits avoiding serious degradation of the rubber, it being known that either excessive milling of rubber in air or excessive heating of rubber at elevated temperatures tends to break down or degrade the rubber molecules and to destroy the nerve of the rubber. Rubber vulcanizates made from degraded rubber have unusually low tensile strength and poor resistance to tear.

The following examples illustrate the invention. The numbers signify parts by weight. The numbers given for ingredients other than rubber refer to parts of such ingredients per 100 parts of rubber.

Masterbatches A and B are first prepared according to the following formulations:

| Masterbatch | A | B |
|---|---|---|
| Smoked sheet | 100 | 100 |
| Carbon black | 50 | 50 |
| Stearic acid | 5 | 5 |
| Chloranil | | 0.75 |

These masterbatches are prepared by intimately incorporating the foregoing ingredients at low temperature preferably in the order given. Then the mixes are each given a heat treatment in a Banbury mixer for 20 minutes at 300° F. During this heat treatment the viscosity of the masterbatches first increases and then gradually decreases, so that by the end of the heating period, the masterbatches are reduced to a viscosity suitable for the milling in of further compounding ingredients. The resulting mixes are cooled to 180° F. whereupon the following ingredients are added while holding the temperature at 180° F.

| Stock | A | B |
|---|---|---|
| Pine tar | 2 | 2 |
| Zinc oxide | 2 | 2 |
| Antioxidant | 1.35 | 1.35 |
| Accelerator | 1 | 1 |
| Sulphur | 3 | 3 |

The above mixes are then vulcanized 45 minutes in molds under 40 lbs. steam pressure.

| Stock | A | B |
|---|---|---|
| Hardness (Shore Durometer) | 60 | 55 |
| Log resistivity | 7.72 | >13.04 |
| Torsional hysteresis at 280° F | 0.108 | 0.078 |
| Abrasion rating, percent | 117 | 127 |

It will be seen that the addition of chloranil to compound B enabled considerably more rapid attainment of high electrical resistance, low torsional hysteresis and improved abrasion resistance.

The specific electrical resistivity is determined by measuring the resistance of a specimen of known thickness (about 0.1") placed between the mercury electrodes of a "Megohm Bridge" (made by General Radio Company, Cambridge, Mass.). It is reported above as the logarithm, to the base 10, of R, the resistivity in ohm-centimeters. The torsional hysteresis reported above represents the logarithmic decrement, to the base 10, of the observed amplitudes of successive oscillations of a torsion pendulum, measured at 280° F. with an apparatus consisting essentially of a torsion pendulum in which the sample of rubber tested supplies the restoring force when the pendulum is deflected. Further details of the measurement of torsional hysteresis are given in the above-mentioned U. S. Patent 2,118,601.

The abrasion ratings given above are based upon an abrasion rating of 100% assigned to a high carbon black stock identical with stock A of the example except that it did not receive the heat treatment given in preparing stocks A and B.

The changes which take place during the heat treatment in the presence of chloranil in accordance with my invention are generally similar to those described in U. S. Patent 2,118,601. However, the viscosity increase during high temperature treatment in the presence of chloranil in accordance with my invention is generally considerably greater than that obtained by following the teachings of said patent.

The chloranil promoter can be added to the rubber and carbon black mixture by conventional mill incorporation, by impregnation, or in any other suitable manner. In the above example it was added to the masterbatch of carbon black and rubber just prior to the heat treatment.

From the foregoing it will be seen that the process of my invention presents many advantages, chief among which is that low-hysteresis processing of rubber and carbon black mixtures is considerably expedited by the use of my chloranil promoter, thereby correspondingly increasing the production from given equipment. Another advantage is that the benefits achieved by the use of chloranil as a promoter far outweigh the cost of its use in my invention. Another advantage is that my invention can be practiced with equipment and methods which are well-known to the rubber manufacturing art.

Having thus described my invention, what I claim and desire to protect by Letters Patent is:

1. A method of manufacturing rubber products having low torsional hysteresis and high electrical resistivity which comprises incorporating a small amount of chloranil in a well-blended mixture of rubber and a rubber-reinforcing carbon black at a temperature substantially below 250° F., said temperature being so low as to prevent thermal decomposition of said chloranil and to prevent reaction of said chloranil with the rubber, subsequently heat-treating the mixture containing said chloranil at a temperature substantially above 250° F. but insufficiently elevated to substantially injure the properties of the rubber, continuing said heat-treating for a time sufficient to substantially lower the torsional hysteresis and substantially increase the electrical resistivity of a vulcanizate of the resulting mixture, said heat-treating step being conducted in the absence of ingredients capable of vulcanizing rubber other than said chloranil, masticating the mixture and incorporating vulcanizing and other desired ingredients, shaping the mixture and vulcanizing the shaped mixture.

2. The method of claim 1 wherein said heat-treating is carried out at a temperature of from 300° to 370° F. and for a period of time of from 10 to 60 minutes.

3. A method of manufacturing rubber products having low torsional hysteresis and high electrical resistivity which comprises incorporating a small amount of chloranil in a uniform mixture of rubber and a rubber-reinforcing carbon black at a temperature substantially below 250° F., said temperature being so low as to prevent thermal decomposition of said chloranil and to prevent reaction of said chloranil with the rubber, subsequently masticating the mixture at a temperature substantially above 250° F. but insufficiently elevated to substantially injure the properties of the rubber, and continuing said mastication for a time sufficient to substantially lower the torsional hysteresis and to substantially increase the electrical resistivity of a vulcanizate of the resulting mixture, said masticating step being conducted in the absence of ingredients capable of vulcanizing rubber other than said chloranil.

4. A method of manufacturing rubber products having low torsional hysteresis and high electrical resistivity which comprises mixing rubber uniformly with at least 25 parts of a rubber-reinforcing carbon black per 100 parts of rubber and thereafter with a small amount of chloranil, the temperature of mixing being substantially below 250° F. and being so low as to prevent thermal decomposition of said chloranil and to prevent reaction of said chloranil with the rubber, heat-treating the resulting mixture at a temperature of from 300° to 370° F. for a time of from 10 to 60 minutes sufficient to substantially lower the torsional hysteresis and substantially increase the electrical resistivity of a vulcanizate of the resulting mixture, said heat-treating step being conducted in the absence of ingredients capable of vulcanizing rubber other than said chloranil, masticating the mixture and incorporating vulcanizing and other desired ingredients, shaping the mixture, and vulcanizing the shaped mixture.

5. A method of manufacturing rubber products having low torsional hysteresis and high electrical resistivity which comprises incorporating chloranil in a well-mixed blend of rubber and from 25 to 100 parts of a rubber-reinforcing carbon black per 100 parts of said rubber, the amount of said chloranil ranging from 0.25 to 2.0 parts per 100 parts of rubber, the temperature of mixing being substantially below 250° F. and being so low as to prevent thermal decomposition of said chloranil and to prevent reaction of said chloranil with the rubber, subsequently heat-treating the mixture at a temperature substantially above 250° F. but insufficiently elevated to substantially injure the properties of the rubber, continuing said heat-treating for a time sufficient to substantially lower the torsional hysteresis and substantially increase the electrical resistivity of a vulcanizate of the resulting mixture, said heat-treating being conducted in the absence of ingredients capable of vulcanizing rubber other than said chloranil, masticating the mixture and incorporating vulcanizing and other desired ingredients, shaping the resulting mixture, and vulcanizing the shaped mixture.

6. A method of manufacturing rubber products having low torsional hysteresis and high electrical resistivity which comprises incorporating chloranil in a well-mixed blend of rubber and a rubber-reinforcing carbon black at a temperature below about 180° F., the amount of said chloranil ranging from 0.25 to 2.0 parts per 100 parts of rubber, subsequently masticating the mixture at a temperature ranging from 300° to 370° F., and continuing said mastication for a time of from 10 to 60 minutes sufficient to substantially lower the torsional hysteresis and to substantially increase the electrical resistivity of a vulcanizate of the resulting mixture, said masticating step being conducted in the absence of ingredients capable of vulcanizing rubber other than said chloranil.

7. A method of manufacturing rubber products having low torsional hysteresis and high electrical resistivity which comprises forming a uniform mixture of unvulcanized natural rubber, from 25 to 100 parts of a rubber-reinforcing carbon black per 100 parts of said rubber, and from 0.25 to 2.0 parts of chloranil per 100 parts of rubber at a temperature substantially below 250° F., said temperature being so low as to prevent thermal decomposition of said chloranil and to prevent reaction of said chloranil with the rubber, subsequently masticating the resulting mixture at a temperature of from 300° to 370° F. for a time of from 10 to 60 minutes sufficient to substantially lower the torsional hysteresis and to substantially increase the electrical resistivity of a vulcanizate of the resulting mixture, said masticating step being conducted in the absence of ingredients capable of vulcanizing rubber other than said chloranil, cooling the mixture to a temperature at which it will not undergo scorching during incorporation of vulcanizing ingredients, incorporating vulcanizing ingredients including sulfur and other desired compounding ingredients, shaping the mixture, and vulcanizing the shaped mixture.

8. A method of manufacturing rubber products having low torsional hysteresis and high electrical resistivity which comprises heat-treating an intimate mixture of rubber, a rubber-reinforcing carbon black, and a small amount of chloranil at a temperature substantially above 250° F. but insufficiently elevated to substantially injure the properties of the rubber, for a time sufficient to substantially lower the torsional hysteresis and substantially increase the electrical resistivity of a vulcanizate of the resulting mixture, said heat-treating step being conducted in the absence of ingredients capable of vulcanizing rubber other than said chloranil, masticating the resulting mixture, incorporating vulcanizing and other desired ingredients, shaping and vulcanizing.

BERNARD C. BARTON.

References Cited in the file of this patent

UNITED STATES PATENTS

| Number | Name | Date |
|---|---|---|
| 1,918,328 | Fisher | July 18, 1933 |
| 2,239,659 | Bradley | Apr. 22, 1941 |
| 2,315,856 | Howland | Apr. 6, 1943 |